US012292712B2

(12) United States Patent
Ishii

(10) Patent No.: US 12,292,712 B2

(45) Date of Patent: May 6, 2025

(54) IMAGE FORMING APPARATUS HAVING PHOTOCONDUCTOR UNIT WITH REMOVABLE DEVELOPING CARTRIDGE AND ELECTRICAL CONNECTORS

(71) Applicant: CANON KABUSHIKI KAISHA, Tokyo (JP)

(72) Inventor: Hirotaka Ishii, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/530,966

(22) Filed: Dec. 6, 2023

(65) Prior Publication Data

US 2024/0111246 A1 Apr. 4, 2024

Related U.S. Application Data

(63) Continuation of application No. 17/973,189, filed on Oct. 25, 2022, now Pat. No. 11,874,629, which is a (Continued)

(30) Foreign Application Priority Data

Mar. 6, 2020 (JP) ................................ 2020-038853

(51) Int. Cl.

*G03G 21/00* (2006.01)
*G03G 21/16* (2006.01)
*G03G 21/18* (2006.01)

(52) U.S. Cl.

CPC ..... *G03G 21/1867* (2013.01); *G03G 21/1652* (2013.01); *G03G 21/1871* (2013.01); (Continued)

(58) Field of Classification Search

CPC .......... G03G 21/1817; G03G 21/1821; G03G 21/1842; G03G 2221/1853; (Continued)

(56) References Cited

U.S. PATENT DOCUMENTS 8,660,453 B2 2/2014 Oda et al.
9,360,834 B1 6/2016 Payne et al.
(Continued)

FOREIGN PATENT DOCUMENTS

JP 2019-028345 A 2/2019

*Primary Examiner* — Robert B Beatty

(74) *Attorney, Agent, or Firm* — Venable LLP

(57) ABSTRACT

A developing cartridge includes a storage medium. A first contact portion is provided in a photoconductor unit and configured to be electrically connected to the storage medium. A second contact portion is provided in an apparatus body. The photoconductor unit is configured to, in a case of attaching the photoconductor unit to the apparatus body, move from a first position to a second position while being guided by a guide member and then move from the second position to a third position below the second position. At least one of the first contact portion and the second contact portion is capable of being displaced such that engagement between the first contact portion and the second contact portion is performed while the photoconductor unit moves by being guided by the guide member, and the engagement is maintained while the photoconductor unit moves from the second position to the third position.

6 Claims, 11 Drawing Sheets

Related U.S. Application Data continuation of application No. 17/172,512, filed on Feb. 10, 2021, now Pat. No. 11,513,468.

(52) U.S. Cl.
CPC ... *G03G 21/1821* (2013.01); *G03G 2221/166* (2013.01); *G03G 2221/1684* (2013.01); *G03G 2221/1869* (2013.01)

(58) Field of Classification Search
CPC ....... G03G 2221/1884; G03G 21/1867; G03G 21/1652; G03G 21/1871; G03G 2221/166; G03G 2221/1684; G03G 2221/1869
USPC ............................................ 399/90, 111, 113
See application file for complete search history.

(56) References Cited

U.S. PATENT DOCUMENTS

| | | | |
|---|---|---|---|
| 10,073,410 | B1 | 9/2018 | Bacon et al. |
| 10,401,789 | B2 | 9/2019 | Kishi et al. |
| 10,649,389 | B1 | 5/2020 | Carpenter et al. |
| 2007/0160380 | A1 | 7/2007 | Imaizumi et al. |
| 2012/0099890 | A1 | 4/2012 | Okabe |
| 2014/0147158 | A1 | 5/2014 | Fujinaka et al. |
| 2014/0169824 | A1 | 6/2014 | Seto et al. |
| 2017/0219995 | A1 | 8/2017 | Sato et al. |
| 2018/0129161 | A1 | 5/2018 | Kim |
| 2019/0196394 | A1 | 6/2019 | Yabuki et al. |

IMAGE FORMING APPARATUS HAVING PHOTOCONDUCTOR UNIT WITH REMOVABLE DEVELOPING CARTRIDGE AND ELECTRICAL CONNECTORS

BACKGROUND OF THE INVENTION

Field of the Invention

The present disclosure relates to an image forming apparatus that forms an image on a recording medium.

Description of the Related Art

Examples of an image forming apparatus such as a laser beam printer or a light-emitting diode (LED) printer include an image forming apparatus which includes a tray that can be drawn out from an apparatus body and in which a plurality of components for performing an image forming process are configured as a cartridge attachable to and detachable from the tray. According to this configuration, a user can easily replace the cartridge by drawing out the tray.

Japanese Patent Laid-Open No. 2019-028345 discloses an image forming apparatus in which a developing cartridge is attachable to and detachable from a tray-shaped drum unit and the drum unit is attached to an apparatus body in the state of accommodating the developing cartridge. A storage medium for storing various information about the developing cartridge is attached to this developing cartridge, and is electrically connected to a relay board provided in a rear portion of the drum unit in the case where the developing cartridge is attached to the drum unit. Further, when the drum unit is inserted in the apparatus body, a contact member provided in the drum unit and electrically connected to the relay board comes into contact with a contact member provided in the apparatus body, and thus it becomes possible for a controller of the apparatus body to obtain information from the storage medium of the developing cartridge.

In the configuration described in Japanese Patent Laid-Open No. 2019-028345, the contact member of the drum unit and the contact member of the apparatus body come into contact with each other when the drum unit is moved in a direction inclined downward with respect to the horizontal direction after the drum unit is moved approximately horizontally along a transfer belt. However, according to this configuration, the contact members are brought into contact with each other in a state in which the drum unit is moving obliquely downward while being urged by gravity without restricting the movement direction by a guide rail or the like that guides insertion of the drum unit, and therefore connection failure can occur.

SUMMARY OF THE INVENTION

The present disclosure provides an image forming apparatus capable of reducing occurrence of connection failure between contact portions.

According to one aspect of the present disclosure, an image forming apparatus includes an apparatus body including a controller, a photoconductor unit including a photoconductor, a guide member provided in the apparatus body and configured to guide movement of the photoconductor unit with respect to the apparatus body, a developing cartridge configured to be attachable to and detachable from an attachment portion provided in the photoconductor unit, and a second contact portion provided in the apparatus body. The photoconductor unit is attached to the apparatus body so as to be drawable from the apparatus body. The developing cartridge includes a casing configured to accommodate developer, a developing roller configured to develop an electrostatic latent image on the photoconductor by using the developer, and a storage medium configured to store information about the developing cartridge, and a first contact portion is provided in the photoconductor unit and configured to be electrically connected to the storage medium in a state in which the developing cartridge is attached to the photoconductor unit. The second contact portion is electrically connected to the controller and configured to be in contact with the first contact portion in a state in which the photoconductor unit is attached to the apparatus body. The photoconductor unit is configured to, in a case of attaching the photoconductor unit to the apparatus body, move from a first position to a second position while being guided by the guide member and then move from the second position to a third position. The first position is a position where the developing cartridge is attachable to and detachable from the attachment portion. The third position is a position which is below the second position and in which an image forming operation on a recording medium is executable. A first direction from the first position toward the second position is a horizontal direction or a direction whose inclination with respect to the horizontal direction is smaller than inclination of a second direction from the second position toward the third position with respect to the horizontal direction. At least one of the first contact portion and the second contact portion is capable of being displaced such that engagement between the first contact portion and the second contact portion is performed while the photoconductor unit moves in the first direction by being guided by the guide member, and the engagement is maintained while the photoconductor unit moves from the second position to the third position.

Further features of the present invention will become apparent from the following description of exemplary embodiments with reference to the attached drawings.

DESCRIPTION OF THE EMBODIMENTS

Exemplary embodiments of the present disclosure will be described below with reference to drawings. In the description below, a side from which a user is supposed to access an image forming apparatus will be referred to as a front side of the image forming apparatus, and a side opposite to the front side will be referred to as a rear side of the image forming apparatus. In the case where a front door is provided, the front door is provided on the front side. In addition, a left side and a right side of the image forming apparatus as viewed from the front will be referred to as a left side and a right side of the image forming apparatus.

In addition, a direction in which an axis of a photosensitive drum extends will be referred to as an X direction, the vertical direction (i.e., gravity direction) will be referred to as a Z direction, and a direction intersecting with the X direction and the Z direction will be referred to as a Y direction. In embodiments below, the X direction is a direction from the right side to the left side of the image forming apparatus, and the Y direction is a direction toward the rear side of the image forming apparatus. The X direction, the Y direction, and the Z direction are preferably perpendicular to one another and constitute an orthogonal coordinate system. That is, the X direction and the Y direction are preferably both horizontal directions. In addition, in the description below, the shapes of constituent elements of the image forming apparatus and the positional relationship between the constituent elements that are mentioned are based on the positions and orientations of the constituent elements in the state of being attached to the image forming apparatus unless otherwise described.

First Embodiment

(1) Schematic Configuration of Image Forming Apparatus

Figure 1:
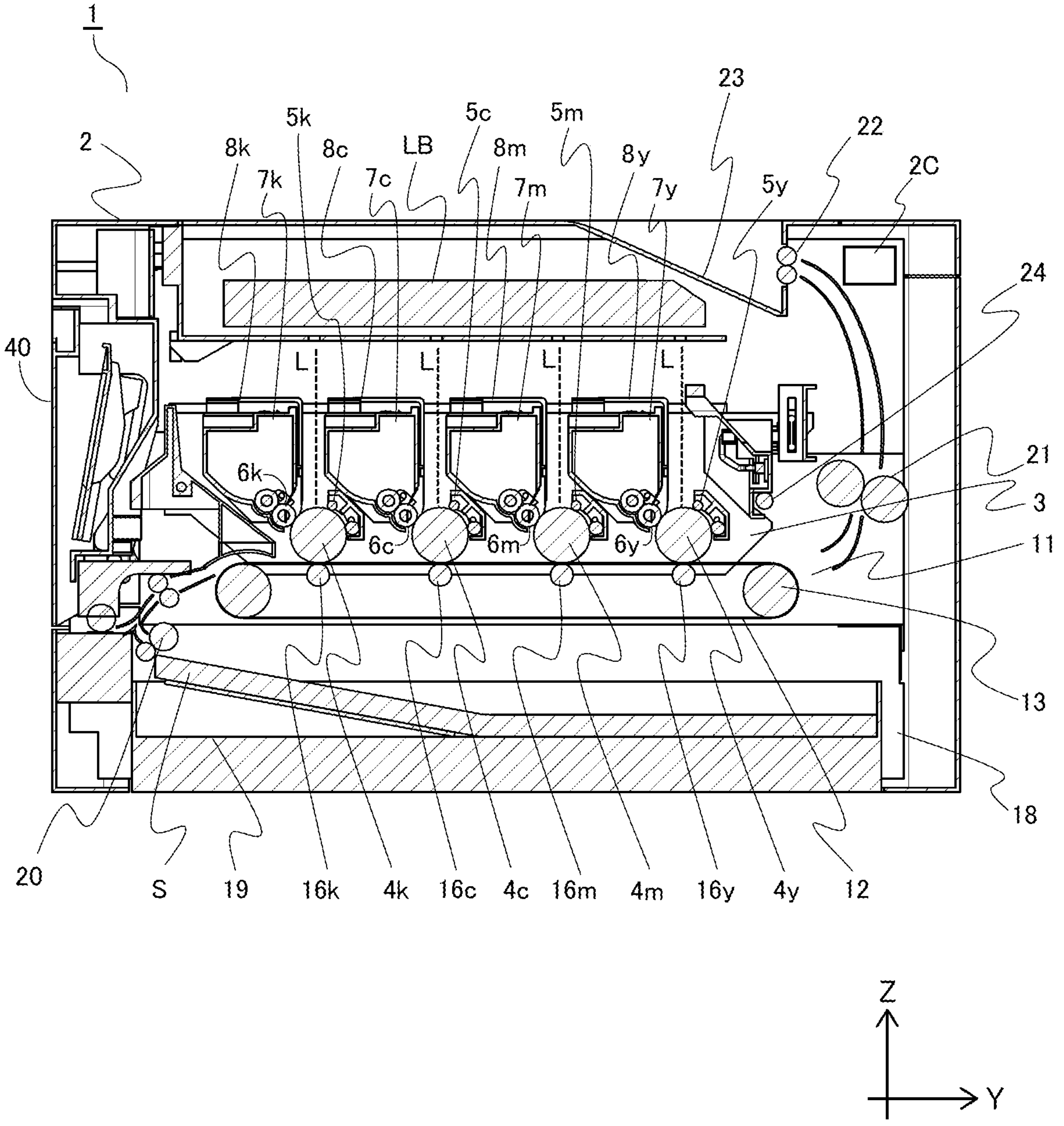
FIG. 1 is a schematic diagram illustrating a sectional configuration of an image forming apparatus according to a first embodiment.

A configuration of an image forming apparatus 1 according to a first embodiment will be described. FIG. 1 is a schematic diagram illustrating a sectional configuration of the image forming apparatus 1 according to the present embodiment. As illustrated in FIG. 1, the image forming apparatus 1 includes an apparatus body 2, a cartridge tray 3, and developing cartridges 8*k*, 8*c*, 8*m*, and 8*y* that are attachably and detachably held by the cartridge tray 3. The image forming apparatus 1 is a full-color laser printer that forms an image on a recording medium by an electrophotographic process using four colors, and forms a color image on a recording medium S. As the recording medium S, a wide variety of sheets of different sizes and materials can be used. Examples of the sheets include paper sheets such as regular paper sheets and cardboards, plastic films, cloths, surface-treated sheet materials such as coated paper sheets, and sheet materials of irregular shapes such as envelopes and index sheets.

Figure 4:
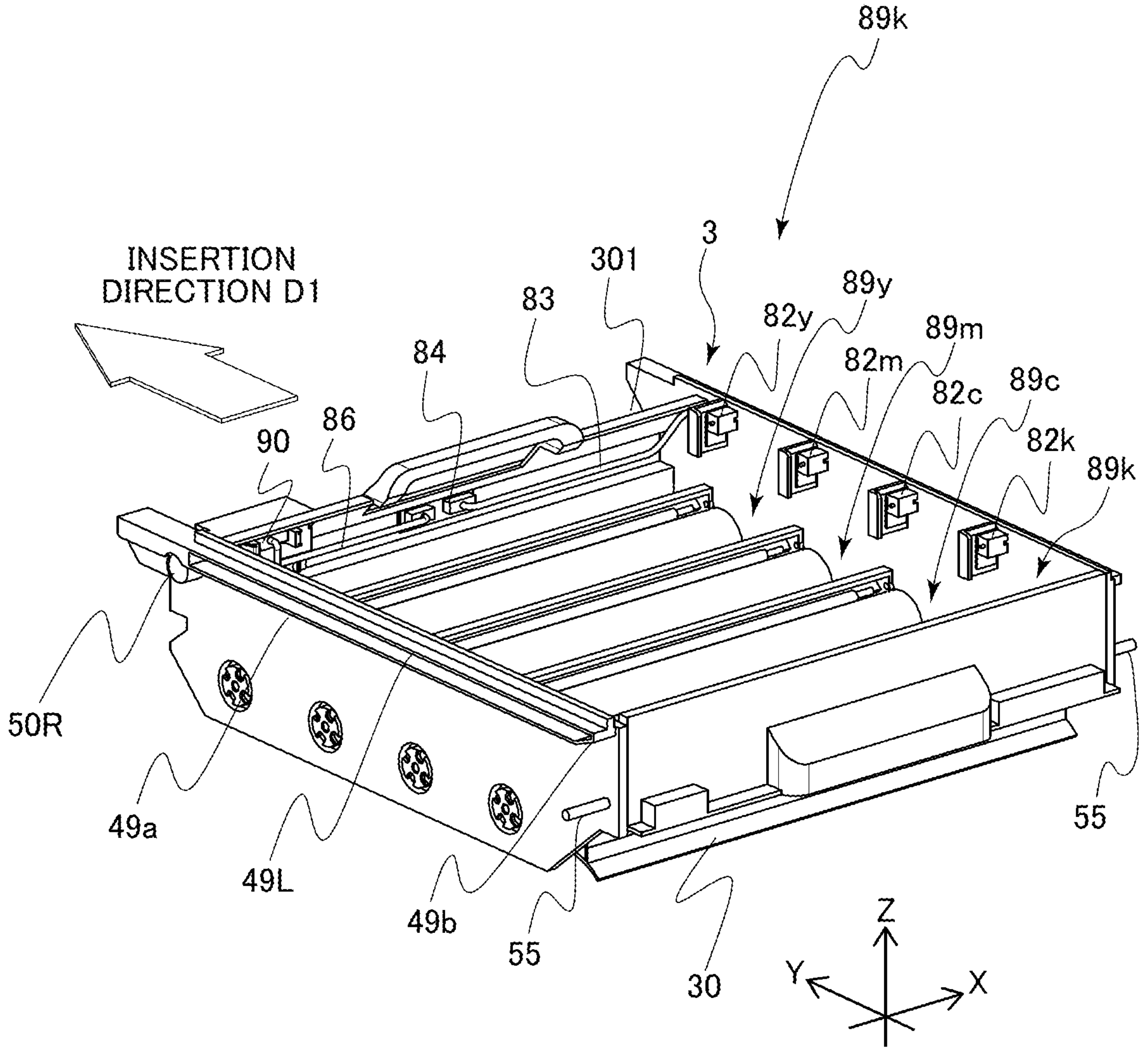
FIG. 4 is a perspective view of the cartridge tray according to the first embodiment in a state in which the cartridges are not attached thereto.

The cartridge tray 3 includes a tray frame body 30, a plurality of photosensitive drums 4*k*, 4*c*, 4*m*, and 4*y* rotatably supported by the tray frame body 30, and cartridge accommodation portions 89*k*, 89*c*, 89*m*, and 89*y* illustrated in FIG. 4 that respectively accommodate the developing cartridges 8*k* to 8*y*. The photosensitive drums 4*k* to 4*y* are each an electrophotographic photoconductor formed in a drum shape and serving as an image bearing member. The cartridge tray 3 is an example of a photoconductor unit including at least one photoconductor. The developing cartridges 8*k* to 8*y* respectively include casings 7*k*, 7*c*, 7*m*, and 7*y* that accommodate developer, and developing rollers 6*k*, 6*c*, 6*m*, and 6*y* for performing a developing process using the developer. In addition, the cartridge tray 3 includes charging rollers 5*k*, 5*c*, 5*m*, and 5*y* respectively corresponding to the photosensitive drums 4*k* to 4*y*.

A front door 40 is openably and closably provided on the front side of the apparatus body 2, and as will be described later, the cartridge tray 3 can be drawn out from the apparatus body 2 to replace the cartridge tray 3 and/or the developing cartridges 8*k* to 8*y* by opening the front door 40. To be noted, the apparatus body 2 is a portion of the image forming apparatus 1 excluding the cartridge tray 3 and the developing cartridges 8*k* to 8*y*, and for example, includes a frame body of the image forming apparatus 1.

In the apparatus body 2, a laser scanner unit LB serving as an exposing unit is provided above the developing cartridges 8*k* to 8*y* and the cartridge tray 3. In addition, in the apparatus body 2, a belt unit 11 serving as a conveyance unit is provided below the developing cartridges 8*k* to 8*y* and the cartridge tray 3. In this belt unit 11, an electrostatic attraction belt 12 having flexibility is stretched over a driving roller 13 and a tension roller 14. The electrostatic attraction belt 12 is an example of a belt member that conveys the recording medium S. The electrostatic attraction belt 12 of the present embodiment is stretched over the driving roller 13 and the tension roller 14 such that the electrostatic attraction belt 12 extends in an approximate horizontal direction between the driving roller 13 and the tension roller 14.

Transfer rollers 16*k*, 16*c*, 16*m*, and 16*y* are disposed in a space enclosed by the electrostatic attraction belt 12 so as to oppose the photosensitive drums 4*k* to 4*y*. These portions where the photosensitive drums 4*k* to 4*y* oppose the transfer rollers 16*k* to 16*y*, that is, nip portions between the photosensitive drums 4*k* to 4*y* and the electrostatic attraction belt 12, are transfer portions where a transfer process is performed.

A feeding unit 18 is provided below the belt unit 11. This feeding unit 18 includes a feeding tray 19 that supports and accommodates recording media S thereon and a feeding roller 20, and feeds the recording media S one by one. A fixing unit 21 that performs a fixing process is provided beside the belt unit 11 in the Y direction. A discharge unit 22 that discharges the recording medium S to the outside of the apparatus body 2 is provided in an upper portion of the apparatus body 2 above the fixing unit 21.

In addition, as schematically illustrated in FIG. 1, the apparatus body 2 includes a control board 2C as a controller that controls the image forming apparatus 1. The control board 2C includes a central processing unit (CPU) that executes a control program of the image forming apparatus 1, and a memory that stores the control program and data or the like required for controlling the image forming apparatus 1. By reading out the control program from the memory and executing the control program, the CPU controls high-voltage boards for applying bias voltages to, for example, the charging rollers 5*k* to 5*y*, a motor for driving the photosensitive drums 4*k* to 4*y*, and so forth to perform an image forming operation.

(2) Image Forming Operation

The image forming operation will be described with reference to FIGS. 1, 2A, and 2B. An operation for forming a full-color image is as follows. Attachment of the cartridge tray 3 and the developing cartridges 8*k* to 8*y* to the image forming apparatus 1 is completed by closing the front door 40 after inserting the cartridge tray 3 in the apparatus body 2 in a state in which the developing cartridges 8*k* to 8*y* are attached to the cartridge tray 3.

When the front door 40 is closed, unillustrated drum driving couplings provided in the image forming apparatus 1 engage with drum couplings 54 connected to the photosensitive drums 4 provided in the cartridge tray 3. When the image forming apparatus 1 receives an instruction to execute image formation, the drum couplings 54 are rotationally driven by a drive output motor via a gear of the apparatus body 2 that are not illustrated, and thus the photosensitive drums 4 are rotationally driven at a predetermined speed. The electrostatic attraction belt 12 is also rotationally driven at a speed corresponding to the speed of the photosensitive drums 4. At this time, the laser scanner unit LB is also driven, and emits light. The charging rollers 5*k* to 5*y* uniformly charge the surface of the photosensitive drums 4 to a predetermined polarity and potential in synchronization with the light emission from the laser scanner unit LB. The laser scanner unit LB exposes the surface of the photosensitive drums 4 with laser light L corresponding to image signals of respective colors in a scanning manner. As a result of this, electrostatic latent images corresponding to image signals of corresponding colors are formed on the surfaces of the photosensitive drums 4, that is, on the photoconductors.

These electrostatic latent images are developed by the developing rollers 6*k* to 6*y* that are rotationally driven at a predetermined speed. Through such a process, a yellow toner image corresponding to a yellow component of the full-color image is formed on the first photosensitive drum 4*y*. Similarly, toner images respectively corresponding to magenta, cyan, and black components of the full color image are formed on the second to fourth photosensitive drums 4*m*, 4*c*, and 4*k*.

Meanwhile, the recording media S are separated and fed one by one from the feeding tray 19 at predetermined control timings. While a recording medium S passes by the first to fourth photosensitive drums 4*y*, 4*m*, 4*c*, and 4*k*, the yellow, magenta, cyan, and black toner images are transferred onto the recording medium S so as to be superimposed on one another. In this manner, an unfixed full-color toner image of four colors is formed on the recording medium S.

The recording medium S onto which the toner image has been transferred is subjected to the fixing process in the fixing unit 21. The fixing unit 21 includes a roller pair that nips and conveys the recording medium S, and a heating mechanism for heating the toner image on the recording medium S, and applies heat and pressure to the unfixed toner image. Examples of the heating mechanism include a halogen lamp and an electromagnetic induction heating unit. As a result of this, the toner is melted, the colors of the toner are mixed, then the toner adheres to the recording medium S, and thus a fixed image fixed to the recording medium S is obtained. The recording medium S having passed through the fixing unit 21 is discharged onto a discharge tray 23 provided on an upper surface of the apparatus body 2 by the discharge unit 22.

(3) Insertion/Draw-Out Operation of Cartridge Tray

Next, an insertion/draw-out operation of the cartridge tray 3 into and from the apparatus body 2 will be described with reference to FIGS. 2A and 2B. FIG. 2A illustrates a state in which the front door 40 has been opened and the cartridge tray 3 has been drawn out to a drawn-out position from the apparatus body 2. To be noted, the drawn-out position is a position where the developing cartridges 8*k* to 8*y* are exposed enough from the apparatus body 2 to easily attach or detach the developing cartridges 8*k* to 8*y*. In the present embodiment, a position where drawing out the cartridge tray 3 is restricted by stoppers that will be described later serves as the drawn-out position.

Figure 2A:
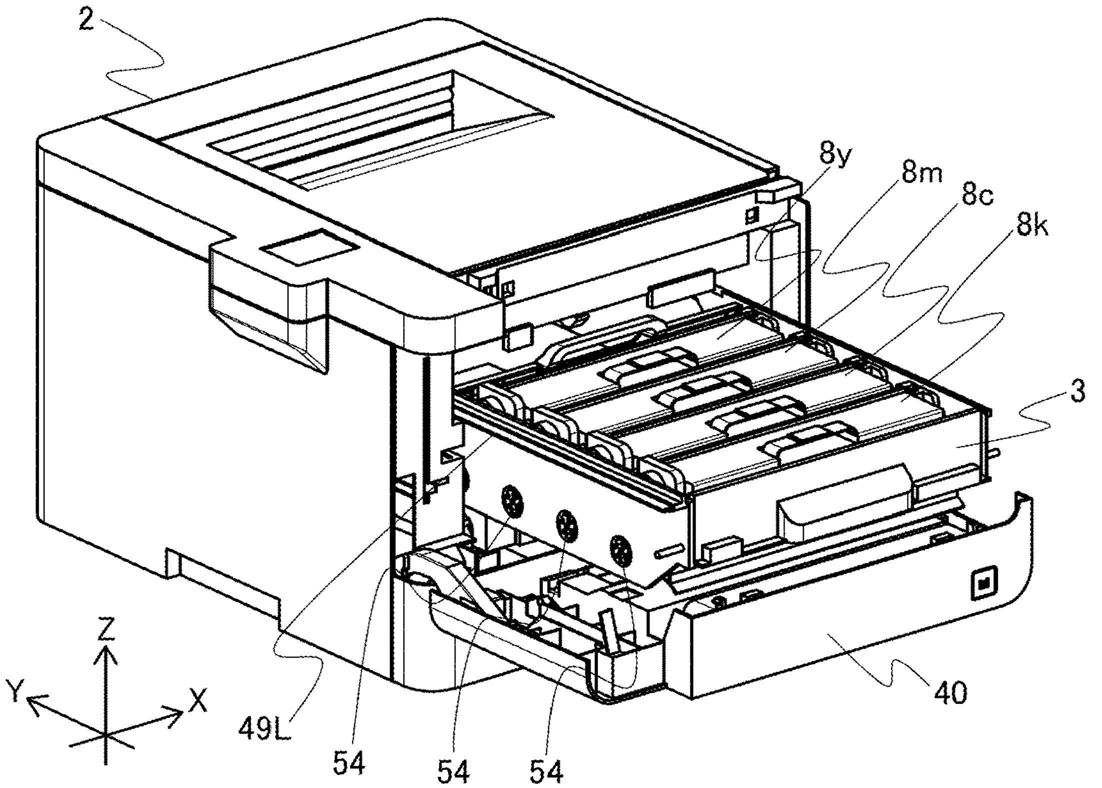
FIGS. 2A and 2B are each a perspective view of the image forming apparatus for describing attachment and detachment of a cartridge tray according to the first embodiment.
Figure 2B:
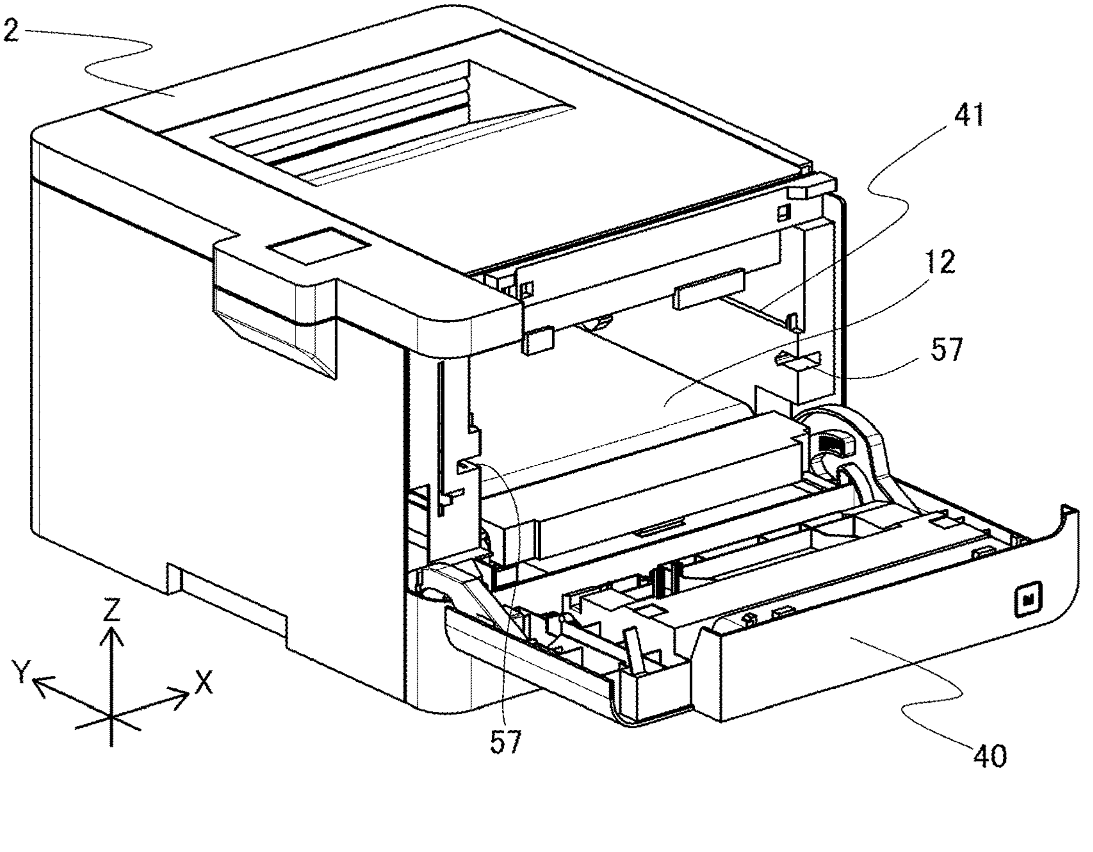

FIG. 2B illustrates a state in which the cartridge tray 3 has been detached from the apparatus body 2. In the case where a conveyance failure, that is, a jam of the recording medium S has occurred in the image forming apparatus 1, by detaching the cartridge tray 3 from the apparatus body 2 as illustrated in FIG. 2B, part of a conveyance path of the recording medium S is exposed, and thus the jammed recording medium S can be easily removed.

Figure 3:
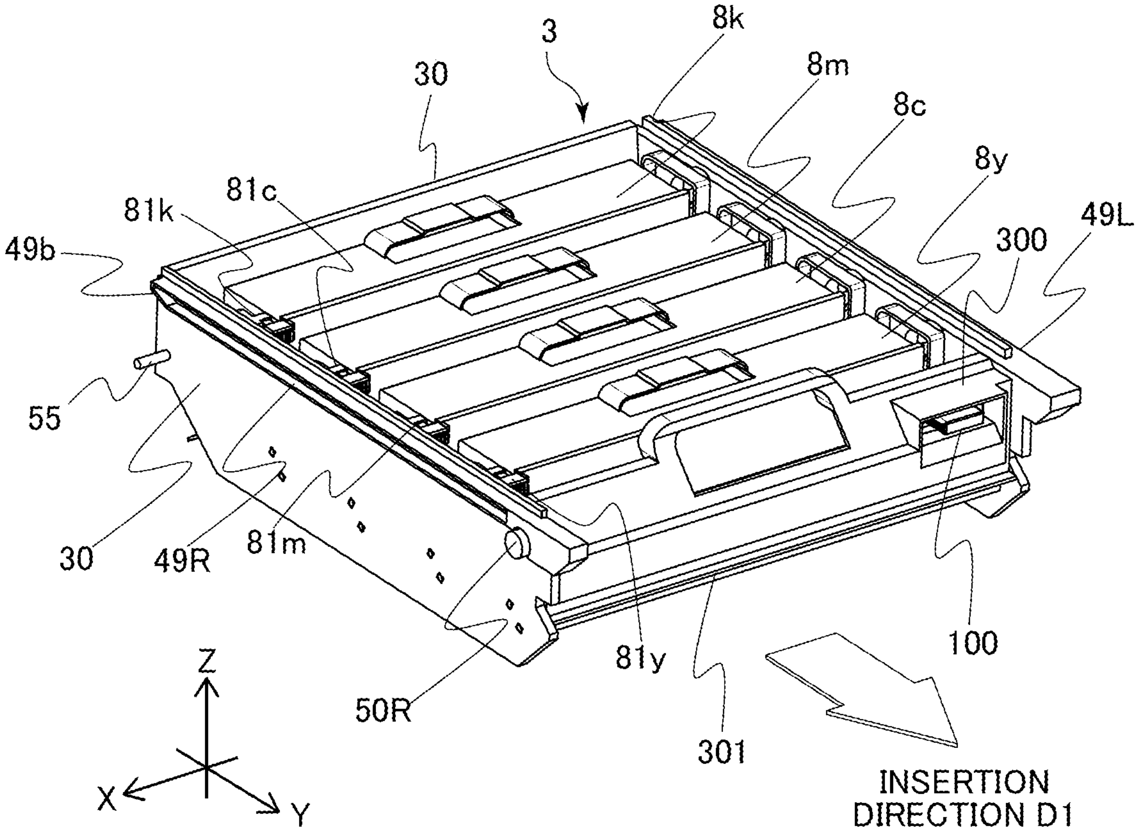
FIG. 3 is a perspective view of the cartridge tray according to the first embodiment in a state in which cartridges are attached thereto.

Next, an insertion/draw-out operation of the cartridge tray 3 will be described with reference to FIGS. 3, 4, and 5A to 5C. FIG. 3 is a perspective view of the cartridge tray 3 as viewed from the downstream side in an insertion direction D1 in a cartridge-attached state in which the developing cartridges 8*k* to 8*y* are attached thereto. FIG. 4 is a perspective view of the cartridge tray 3 as viewed from the upstream side in the insertion direction D1 in a non-cartridge-attached state in which the developing cartridges 8*k* to 8*y* are not attached thereto. To be noted, the insertion direction D1 serving as a first direction of the present embodiment is a movement direction of the cartridge tray 3 at the time of inserting the cartridge tray 3 into the apparatus body 2 from the drawn-out position. The insertion direction D1 of the present embodiment is substantially a horizontal direction as viewed in the X direction.

On side surfaces of the tray frame body 30 of the cartridge tray 3 in the X direction, tray guides 49L and 49R projecting to the outside from the respective side surfaces of the tray frame body 30 are provided as illustrated in FIGS. 3 and 4. In addition, guide rollers 50L and 50R rotatably supported with respect to the tray frame body 30 are respectively provided on rear side portions of the tray guides 49L and 49R in the Y direction.

A guide configuration of the cartridge tray 3 will be described in detail with reference to FIGS. 5A to 5C. To be noted, since the guide configuration on one side in the X direction and the guide configuration on the other side in the X direction are substantially symmetrical to each other, the one side and the other side in the X direction are not distinguished in description of FIGS. 5A to 5C, and it is assumed that the described configuration is provided on both sides in the X direction. For example, the tray guides 49L and 49R will be each described as a "tray guide 49" without distinction, and the guide rollers on the one side and the other side in the X direction will be each described as a "guide roller 50" without distinction.

Figure 5A:
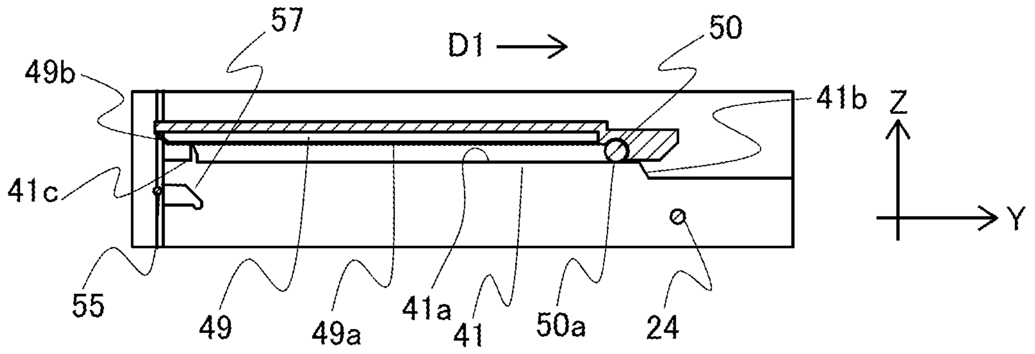
FIGS. 5A to 5C are diagrams for describing an insertion/draw-out trajectory of the cartridge tray according to the first embodiment.

As illustrated in FIG. 5A, a lower surface 49*a* of the tray guide 49 provided on the lower side in the Z direction is a surface extending in the Y direction. In addition, the lowermost portion of the guide roller 50 projects more downward than the tray guide 49 in the Z direction. In addition, a tray guide inclined surface 49*b* is provided at an end portion of the tray guide 49 on the front side in the Y direction. The tray guide inclined surface 49*b* is inclined such that a portion thereof closer to an end portion of the tray guide 49 on the front side is higher in the Z direction, that is, such that a portion closer to an end portion of the tray guide 49 in the insertion direction D1 is lower in the Z direction.

Next, a guide configuration of the cartridge tray 3 provided in the apparatus body 2 will be described. As illustrated in FIG. 2B, a guide rail 41 serving as a guide member of the present embodiment is provided on each side surface of an accommodation portion of the cartridge tray 3 in the apparatus body 2. As illustrated in FIG. 5A, each guide rail 41 includes a guide surface 41*a* extending in the insertion direction D1. Further, as illustrated in FIG. 5A, an inclined surface 41*b* continuous with the guide surface 41*a* is provided on the rear side of each guide rail 41 in the Y direction. The inclined surface 41*b* is inclined such that a portion thereof closer to an end portion thereof on the rear side is lower in the Z direction, that is, such that a portion closer to an end portion thereof in the insertion direction D1 is lower in the Z direction. The guide surface 41*a* and the inclined surface 41*b* are an example of a guide shape that comes into contact with the guide roller 50 serving as a guided portion to restrict the movement direction of the cartridge tray 3. In addition, a tray stopper 41*c* projecting upward in the Z direction from the guide surface 41*a* of the guide rail 41 is formed on an end portion of the guide rail 41 on the front side in the image forming apparatus 1.

In the description below, the position of the cartridge tray 3 illustrated in FIG. 5C will be referred to as an "attached position". When the cartridge tray 3 is in the attached position, the photosensitive drums 4*k* to 4*y* are in contact with the electrostatic attraction belt 12, and the image forming apparatus 1 can perform the image forming operation, that is, an image can be formed. The position of the cartridge tray 3 illustrated in FIG. 5B will be referred to as a "drum separation position". In the case where the cartridge tray 3 is in the drum separation position, the photosensitive drums 4*k* to 4*y* are separated upward from the electrostatic attraction belt 12. In addition, as described above, the position where the cartridge tray 3 has been drawn out such that the attachment and detachment of the developing cartridges 8*k* to 8*y* are possible will be referred to as a "drawn-out position". The drawn-out position serves as a first position of the present embodiment, the drum separation position serves as a second position of the present embodiment, and the attached position serves as a third position of the present embodiment. The attached position is lower than the drum separation position in the Z direction. In addition, although the drawn-out position of the present embodiment is at approximately the same height as the drum separation position in the Z direction, the height of the drawn-out position and the height of the drum separation position may be different.

An attachment operation of the cartridge tray 3 to the apparatus body 2 will be described below.

After replacing the developing cartridges 8*k* to 8*y*, a user pushes the cartridge tray 3 positioned at the drawn-out position in the insertion direction D1 to insert the cartridge tray 3 in the apparatus body 2. FIG. 5A illustrates a state in the middle of movement of the cartridge tray 3 from the drawn-out position to the drum separation position. At this time, the cartridge tray 3 is guided by the guide rails 41 and moves in the insertion direction D1. Specifically, the lower surfaces 49*a* of the tray guides 49 slide with respect to the tray stoppers 41*c*, and the guide rollers 50 roll on the guide surfaces 41*a* of the guide rails 41. In addition, while the cartridge tray 3 moves from the drawn-out position to the drum separation position, the photosensitive drums 4*k* to 4*y* are separated from the electrostatic attraction belt 12.

Figure 5B:
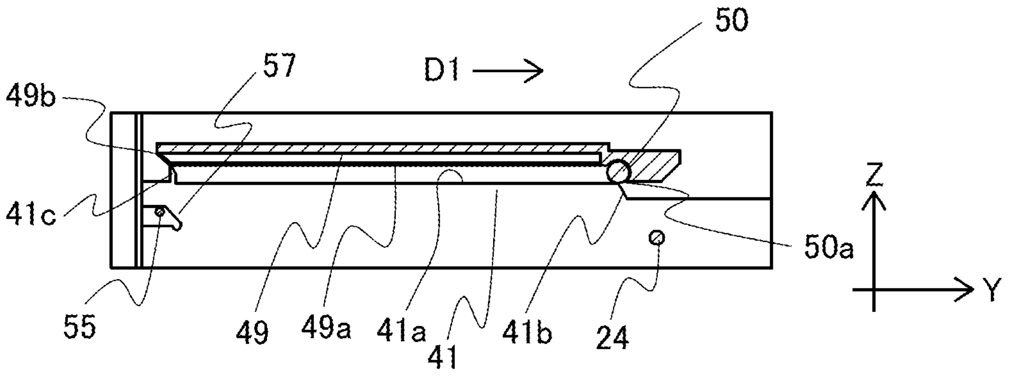

FIG. 5B illustrates a state in which the cartridge tray 3 has reached the drum separation position. At this stage, the lower surfaces 49*a* of the tray guides 49 pass the tray stoppers 41*c*, and the tray guide inclined surfaces 49*b* start contacting the tray stoppers 41*c*. In addition, the guide rollers 50 pass the downstream ends of the guide surfaces 41*a* in the insertion direction D1, and start contacting the tray guide inclined surfaces 49*b*. However, at this time, the photosensitive drums 4*k* to 4*y* are still separated upward from the electrostatic attraction belt 12.

After the cartridge tray 3 passes the drum separation position, the cartridge tray 3 moves in an attachment completion direction D2 inclined downward in the Z direction toward the rear side in the Y direction with respect to the horizontal direction. Specifically, the tray guide inclined surfaces 49*b* slide with respect to the tray stoppers 41*c*, and the guide rollers 50 roll on the inclined surfaces 41*b*. The attachment completion direction D2 is inclined more than the insertion direction D1 with respect to the horizontal direction. In other words, the insertion direction D1 serving as the first direction from the first position toward the second position in the present embodiment is substantially a horizontal direction. As will be described later, the first direction is not limited to a horizontal direction, and may be any direction as long as the inclination of the first direction with respect to the horizontal direction is smaller than the inclination of the second direction from the second position to the third direction with respect to the horizontal direction. In the present embodiment, the insertion direction D1 serves as the first direction, the attachment completion direction D2 serves as the second direction, and the Y direction serves as the horizontal direction.

Figure 5C:
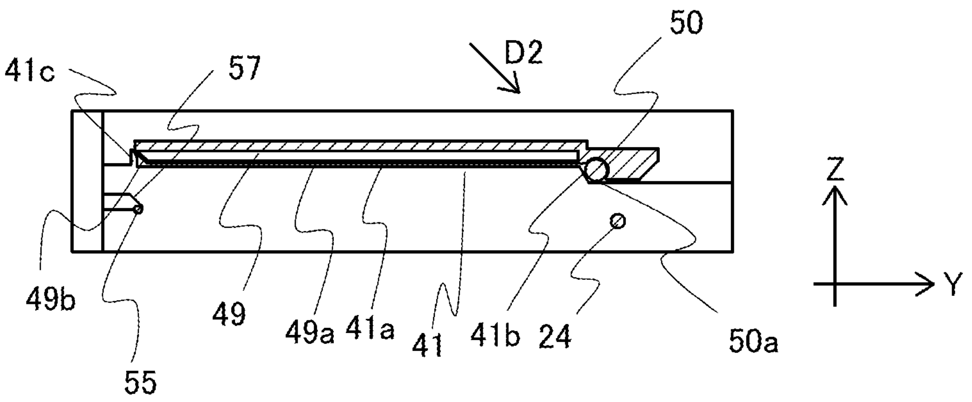
Figure 8A:
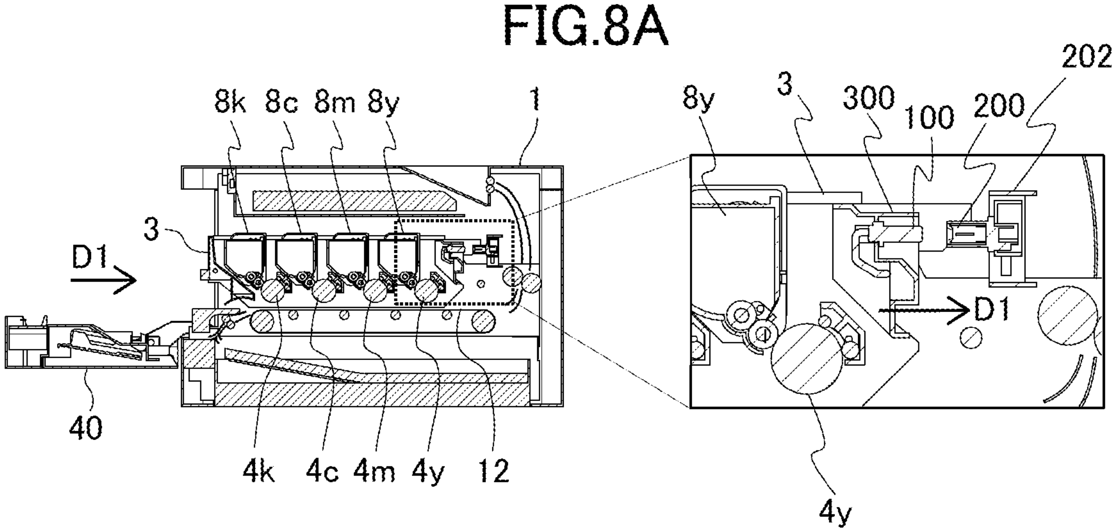
FIGS. 8A to 8C are diagrams for describing connection of connectors according to the first embodiment.
Figure 8B:
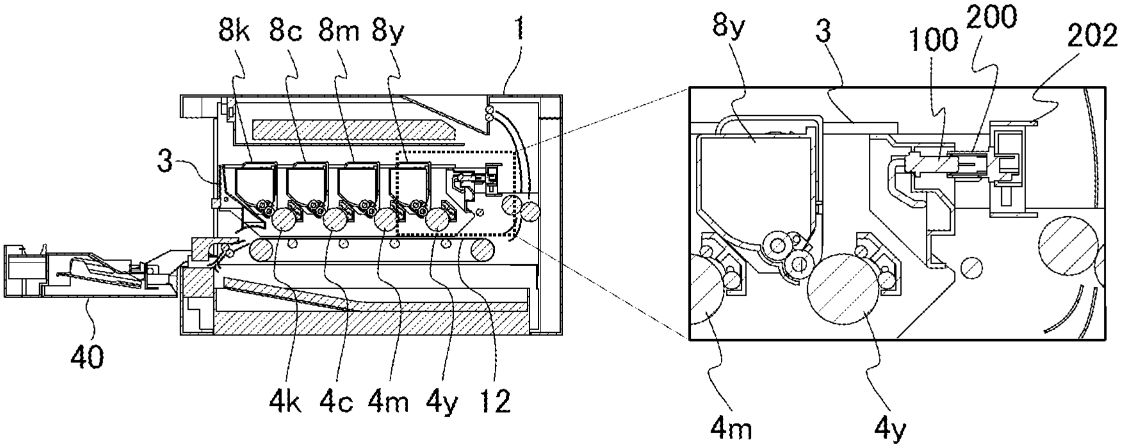
Figure 8C:
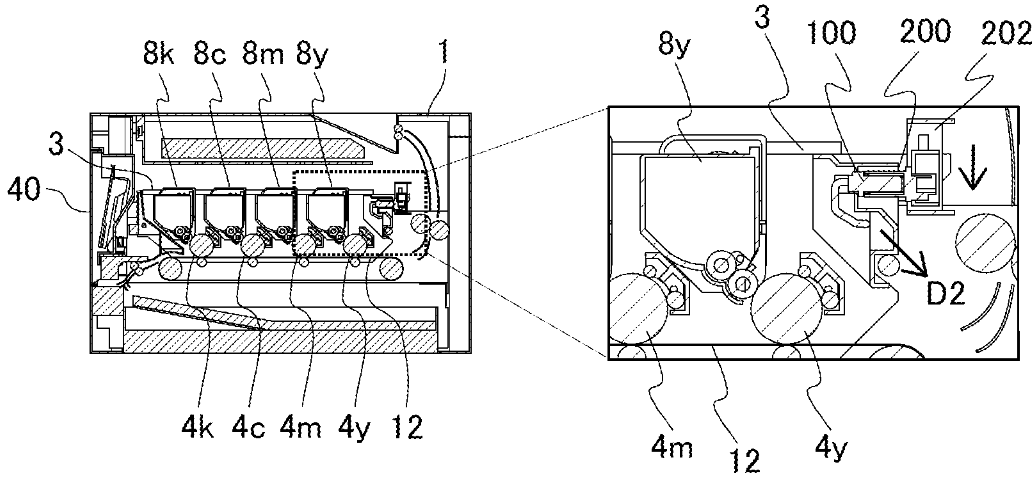

As a result of this, as illustrated in FIG. 5C, the cartridge tray 3 reaches the attached position, and the photosensitive drums 4*k* to 4*y* come into contact with the electrostatic attraction belt 12 as illustrated in FIG. 8C.

When the cartridge tray 3 is in the attached position, the lower surfaces 49*a* of the tray guides 49 are positioned on the rear side in the Y direction with respect to the tray stoppers 41*c*. In addition, when the cartridge tray 3 is in the attached position, the guide rollers 50 are positioned on the rear side in the Y direction, that is, the downstream side in the insertion direction D1, with respect to the tray guide inclined surfaces 49*b*. Therefore, movement of the cartridge tray 3 to the front side in the Y direction is restricted. Further, a penetrating shaft 55 illustrated in FIGS. 3 and 4 penetrating the tray frame body 30 of the cartridge tray 3 in the X direction fits in positioning grooves 57 provided in the apparatus body 2, and thus the cartridge tray 3 is positioned in the Y direction. In addition, at this time, the cartridge tray 3 is positioned by abutting a positioning portion 24 of the apparatus body 2 illustrated in FIG. 1 on the rear side in the Y direction. Then, by closing the front door 40, it becomes possible for the image forming apparatus 1 to perform the image forming operation.

The operation of drawing out the cartridge tray 3 from the apparatus body 2 is performed in a process of an order reversed from the attaching operation.

That is, when replacing the developing cartridges 8*k* to 8*y*, the user opens the front door 40 of the image forming apparatus 1, and draws out the cartridge tray 3 positioned in the attached position to the front side in the Y direction. Then, the cartridge tray 3 moves from the attached position of FIG. 5C to the drum separation position of FIG. 5B in a direction opposite to the attachment completion direction D2. Specifically, the tray guide inclined surfaces 49*b* slide with respect to the tray stoppers 41*c*, and the guide rollers 50 roll upward on the inclined surfaces 41*b*. As a result of this, the photosensitive drums 4*k* to 4*y* are separated from the electrostatic attraction belt 12, and damage to the photosensitive drums 4*k* to 4*y* in the rest of the draw-out operation is suppressed.

When the user draws out the cartridge tray 3 further, the cartridge tray 3 is guided by the guide rails 41 and moves to the front side in the Y direction, that is, in a direction opposite to the insertion direction D1. Specifically, the lower surfaces 49*a* of the tray guide 49 slide with respect to the tray stoppers 41*c*, and the guide rollers 50 roll on the guide surfaces 41*a* of the guide rail 41.

When the cartridge tray 3 reaches the drawn-out position illustrated in FIG. 2A, the movement of the cartridge tray 3 to the front side in the Y direction is restricted by the tray stoppers 41*c*. In this state, the user can perform the operation of replacing the developing cartridges 8*k* to 8*y* by attaching and detaching the developing cartridges 8*k* to 8*y* to and from the cartridge tray 3. In addition, the user can detach the cartridge tray 3 from the apparatus body 2 by lifting up the cartridge tray 3 positioned in the drawn-out position and thus disengaging the cartridge tray 3 from the tray stoppers 41*c*. As a result of this, the user can also replace or perform maintenance of the cartridge tray 3 including the photosensitive drums 4*k* to 4*y*.

(4) Configuration of In-Tray Connector and In-Body Connector

Next, a configuration for electrically connecting memories attached to the developing cartridges 8*k* to 8*y* to the apparatus body 2 via the cartridge tray 3 will be described.

As illustrated in FIG. 3, memory tags 81*k*, 81*c*, 81*m*, and 81*y* serving as storage media are respectively attached to the developing cartridges 8*k* to 8*y*. The memory tags 81*k* to 81*y* respectively include memory chips storing information about the developing cartridges 8*k* to 8*y* to which the memory chips are attached, and electrical contact portions electrically connected to the memory chips and exposed to the outside of the developing cartridges 8*k* to 8*y*. The memory tags 81*k* to 81*y* can store various information such as the capacities of the developing cartridges 8*k* to 8*y*, the types of accommodated toner, current tonner amounts, manufacturing lots, and so forth.

As illustrated in FIGS. 3 and 4, the cartridge tray 3 is provided with tray memory contacts 82*k*, 82*c*, 82*m*, and 82*y*, a relay board 84, and an in-tray connector 100. The tray memory contacts 82*k* to 82*y* are respectively provided at positions corresponding to the memory tags 81*k* to 81*y* of the case where the developing cartridges 8*k* to 8*y* are accommodated in the cartridge accommodation portions 89*k* to 89*y* serving as attachment portions provided in the cartridge tray 3. When the developing cartridges 8*k* to 8*y* are attached to the cartridge tray 3, electrical contact portions of the memory tags 81*k* to 81*y* respectively come into contact with corresponding ones of the tray memory contacts 82*k* to 82*y*.

The relay board 84 is provided in a rear surface portion of the cartridge tray 3, that is, a side surface portion of the cartridge tray 3 on the rear side in the Y direction as illustrated in FIG. 4. In the cartridge tray 3, the tray memory contacts 82*k* to 82*y* are connected to the relay board 84 via a wiring portion 83. To be noted, the relay board 84 is provided with an unillustrated drum memory tag that is a storage medium storing information about the photosensitive drums 4.

The in-tray connector 100 serving as a first contact portion or a photoconductor unit contact portion is also provided in the rear surface portion of the cartridge tray 3. The in-tray connector 100 is exposed to the rear side of a rear frame 30B of the tray frame body 30 in the Y direction, that is, to the downstream side in the insertion direction D1 as illustrated in FIG. 3. In addition, a connector cover portion 300 positioned above the in-tray connector 100 and configured to cover at least part of the in-tray connector 100 as viewed in the Z direction is provided in the tray frame body 30.

The in-tray connector 100 is connected to the relay board 84 via a wiring portion 86. Therefore, when the developing cartridges 8*k* to 8*y* are attached to the cartridge tray 3, the memory tags 81*k* to 81*y* are electrically connected to the in-tray connector 100 via the tray memory contacts 82*k* to 82*y*, the wiring portion 83, the relay board 84, and the wiring portion 86.

Figure 6A:
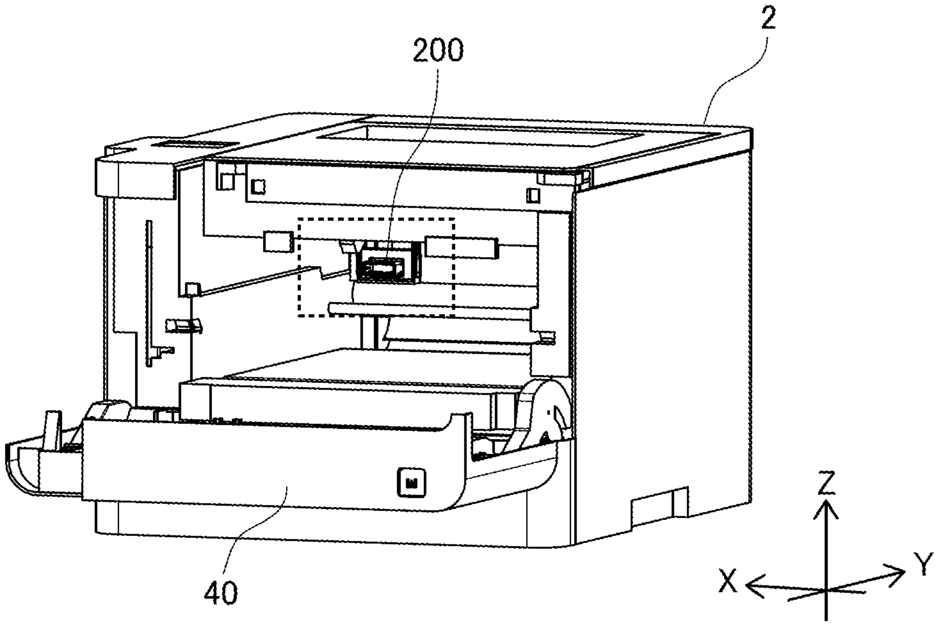
FIGS. 6A and 6B are diagrams for describing arrangement of an in-body connector according to the first embodiment.
Figure 6B:
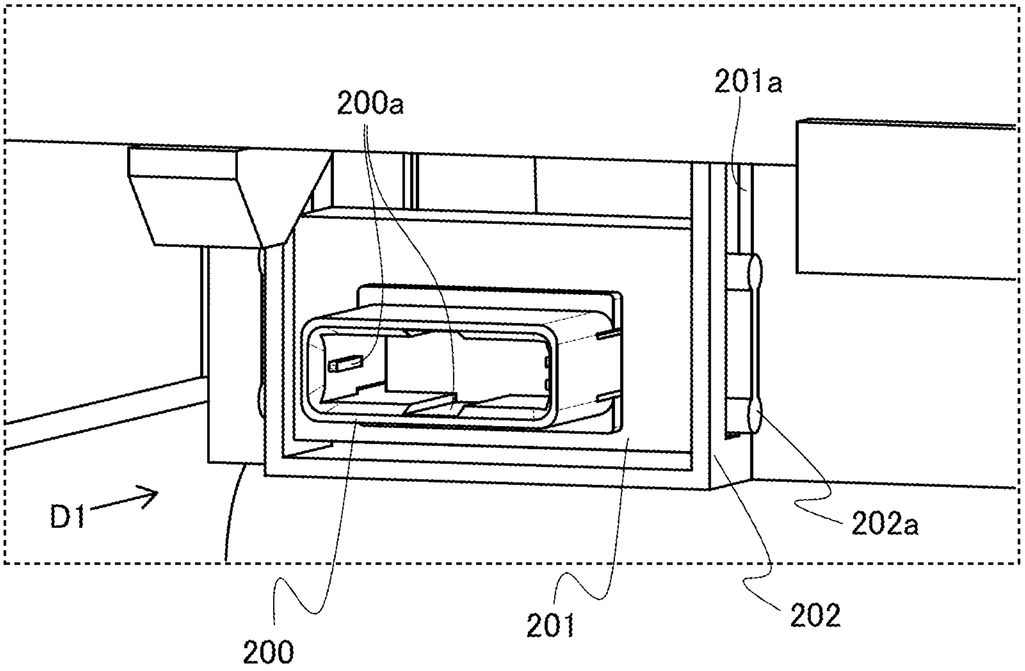
Figure 7A:
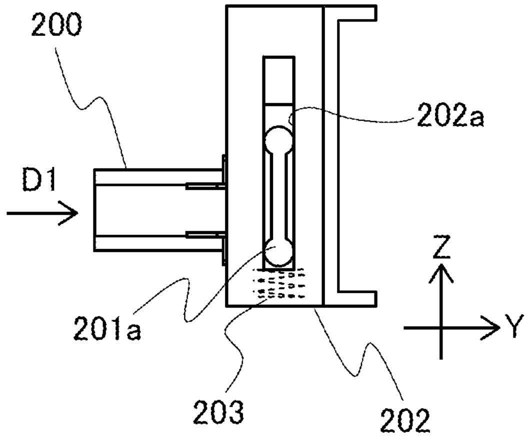
FIGS. 7A and 7B are diagrams for describing movement of the in-body connector according to the first embodiment.
Figure 7B:
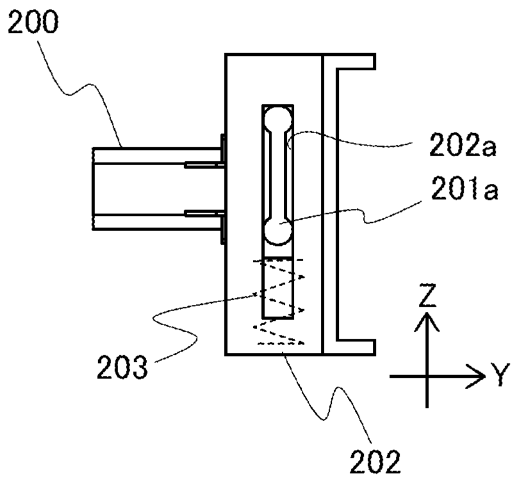

Next, the configuration of the in-body connector 200 will be described with reference to FIGS. 6A to 7B. FIG. 6A is a perspective view of the apparatus body 2 as viewed from the front side in a state in which the cartridge tray 3 has been detached. FIG. 6B is an enlarged view of a portion enclosed by a dot line in FIG. 6A. FIGS. 7A and 7B are each a schematic diagram illustrating a support configuration of the in-body connector 200.

As illustrated in FIGS. 6A and 6B, the in-body connector 200 is an example of a second contact portion serving as a body contact portion provided in the apparatus body 2. The in-body connector 200 is electrically connected to the control board 2C of the apparatus body 2 illustrated in FIG. 1 via an unillustrated wiring portion. As illustrated in FIGS. 6B and 7A, the in-body connector 200 is held by a connector holder 201 in an orientation directed upstream in the insertion direction D1, that is, directed to the front side in the Y direction.

The connector holder 201 is movably held by a connector guide 202 fixed to the apparatus body 2. The connector guide 202 is provided with a guide rail 202*a* extending in the up-down direction, that is, an approximate vertical direction, and a guide protrusion 201*a* of the connector holder 201 is guided by the guide rail 202*a*. As a result of this, the movement direction of the connector holder 201 is restricted to the approximate vertical direction. That is, the in-body connector 200 serving as a second contact portion or a body contact portion of the present embodiment is configured to be displaceable, that is, movable in the vertical direction.

In addition, as schematically illustrated in FIGS. 7A and 7B, the connector holder 201 is urged upward in the Z direction by a spring member 203 serving as an urging member. Therefore, in a state in which the cartridge tray 3 is not attached to the apparatus body 2, the in-body connector 200 is configured to stand by in an upper position in a movable range thereof. The upper position of the in-body connector 200 is approximately at the same height in the Z direction as the in-tray connector 100 at the time when the cartridge tray 3 moves from the drawn-out position to the drum separation position by being guided by the guide rails 41.

To be noted, although the cartridge tray 3 is not attached to the apparatus body 2 in FIGS. 6A and 6B, the in-body connector 200 is illustrated in a state in which the in-body connector 200 is positioned below the upper position for the sake of convenience of description. In addition, the spring member 203 is an example of an urging member and may be provided in a position different from an illustrated position, and an urging member different from a spring may be used.

As will be described later with reference to FIGS. 8A to 8C, the in-body connector 200 is configured to engage with the in-tray connector 100 while the cartridge tray 3 moves from the drawn-out position to the drum separation position in the insertion direction D1. The "engagement" between the in-body connector 200 and the in-tray connector 100 refers to a state in which the connectors are physically bound by each other such that relative movement therebetween in a direction intersecting with the insertion direction D1, particularly the Z direction, is restricted. To be noted, the terminal of the in-body connector 200 does not have to be in contact with the terminal of the in-tray connector 100. For example, in the case where drawer connectors are used as the in-body connector 200 and the in-tray connector 100, a state in which the terminals are not in contact with each other and resin housings protecting the terminals are partially fitted together, that is, a provisionally connected state is also referred to as "engagement".

In addition, the movable range of the in-body connector 200 is set such that the engaged state with the in-tray connector 100 is maintained while the cartridge tray 3 moves from the drum separation position to the attached position. Specifically, the length of the guide rail 202*a* and the like is set such that a movement amount of the in-tray connector 100 in the Z direction in movement of the cartridge tray 3 from the drum separation position to the attached position is within the movable range of the in-body connector 200 in the Z direction. In addition, such a connector shape that an amount in which the in-tray connector 100 can move in the Y direction while maintaining the engaged state with the in-body connector 200 is equal to or greater than the movement amount of the in-tray connector 100 at the time when the cartridge tray 3 moves from the drum separation position to the attached position in the Y direction is employed.

To be noted, a guide shape 200*a* extending in the insertion direction D1 can be preferably provided in at least one of the in-tray connector 100 and the in-body connector 200 as illustrated in FIG. 6B.

(5) Connection Operation Between In-Tray Connector and In-Body Connector

Next, a connection operation between the in-tray connector 100 and the in-body connector 200 will be described. FIGS. 8A to 8C illustrate the positions of the cartridge tray 3 on the left side and the states of the in-body connector 200 and the in-tray connector 100 on the right side at respective stages of the attachment operation of the cartridge tray 3. FIG. 8A illustrates a state in the middle of the movement of the cartridge tray 3 from the drawn-out position to the drum separation position, FIG. 8B illustrates a state in which the cartridge tray 3 is at the drum separation position, and FIG. 8C illustrates a state in which the cartridge tray 3 is at the attached position.

When the cartridge tray 3 is inserted in the insertion direction D1 from the drawn-out position to the drum separation position along the guide rails 41, the in-body connector 200 stands by at the upper position by being urged by the spring member 203 described above as illustrated in FIG. 8A. When the cartridge tray 3 is inserted further, the leading end of the in-tray connector 100 in the insertion direction D1 reaches the in-body connector 200 before the cartridge tray 3 reaches the drum separation position. Then, at least when the cartridge tray 3 has reached the drum separation position as illustrated in FIG. 8B, the in-tray connector 100 and the in-body connector 200 are engaged, that is, provisionally connected. However, the terminals of the in-tray connector 100 and the in-body connector 200 are not electrically connected to each other.

When the cartridge tray 3 moves from the drum separation position toward the attached position in the attachment completion direction D2, the in-body connector 200 moves downward in the Z direction in accordance with the movement of the in-tray connector 100 in the attachment completion direction D2. In addition, since the movement of the in-body connector 200 in the Y direction is restricted, the in-tray connector 100 is fitted deeper with the in-body connector 200, and thus the terminals come into contact with each other. Then, when the cartridge tray 3 reaches the attached position, the connection between the in-tray connector 100 and the in-body connector 200 is completed.

As described above, when the cartridge tray 3 is in the attached position, the memory tags 81*k* to 81*y* of the developing cartridges 8*k* to 8*y* are electrically connected to the control board 2C of the apparatus body 2 via a connection portion between the in-tray connector 100 and the in-body connector 200. As a result of this, the control board 2C can access the memory tags 81*k* to 81*y* and read out stored information.

(6) Effects of Present Embodiment

As described above, in the present embodiment, the in-tray connector 100 engages with the in-body connector 200 while the cartridge tray 3 moves from the drawn-out position to the drum separation position in the insertion direction D1. According to this configuration, the cartridge tray 3 can be stably connected to the apparatus body 2 when attaching the cartridge tray 3. This will be described below.

As a comparative example, a configuration in which the in-tray connector 100 does not engage with the in-body connector 200 while the cartridge tray 3 moves in the insertion direction D1 and engages with the in-body connector 200 when the cartridge tray 3 moves from the drum separation position to the attached position in the attachment completion direction D2 is considered. However, in this case, the cartridge tray 3 does not receive the guiding effect of the guide surfaces 41*a* of the guide rails 41, and the connectors engage with each other in a state in which the connectors are moving obliquely downward by being urged by the weight of the cartridge tray 3 and the developing cartridges 8*k* to 8*y*. Therefore, a connection failure can occur. In addition, when there is deviation between the positions of the connectors, there is a risk that the connectors collide with each other and are thus damaged.

In contrast, in the present embodiment, the in-tray connector 100 engages with the in-body connector 200 while the cartridge tray 3 is guided by the guide rails 41 and moves in the insertion direction D1 that is closer to the horizontal direction than the attachment completion direction D2. Therefore, the connectors can be more reliably engaged than in the configuration of the comparative example.

In addition, in the present embodiment, the in-body connector 200 and the in-tray connector 100 are each disposed in an orientation directed upstream or downstream in the insertion direction D1, which is an approximate horizontal direction. As a result of this, the possibility of foreign matter such as dust entering the inside of the connectors is reduced, which contributes to stable connection between the connectors.

(7) Modification Example

Figure 9:
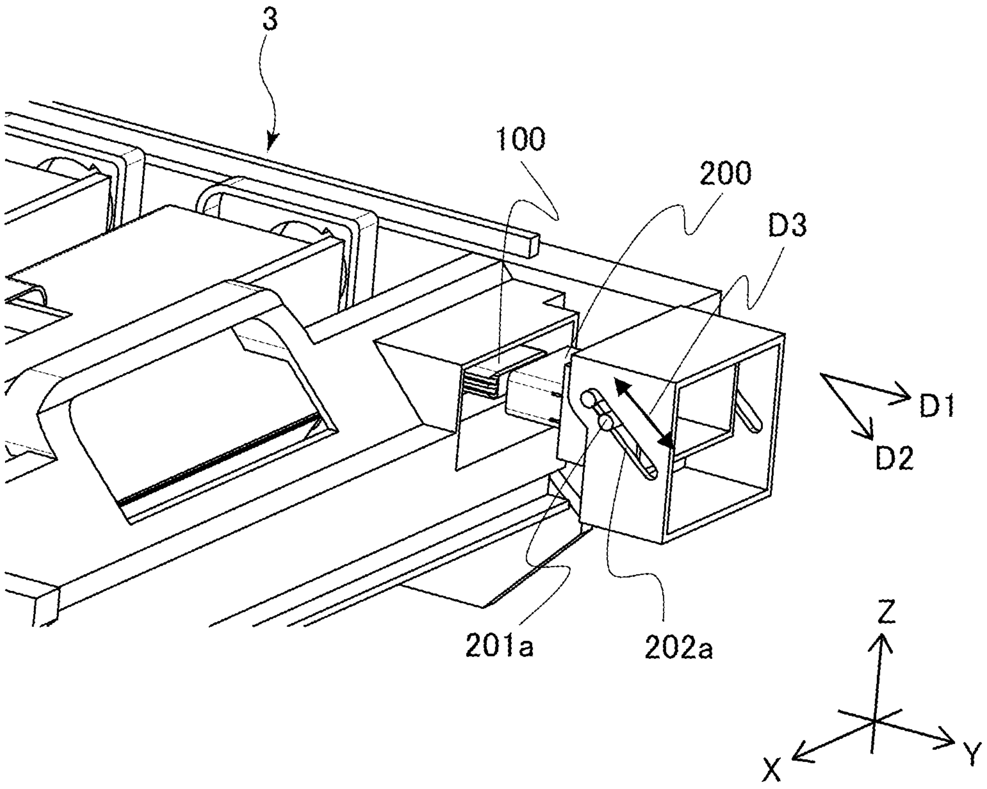
FIG. 9 is a perspective view of an in-tray connector according to a modification example of the first embodiment.

Although the in-body connector 200 that slides in the approximate vertical direction has been described as an example of a second contact portion or a body contact portion that can be displaced in the vertical direction in the first embodiment described above, the in-body connector 200 that slides in a movement direction D3 intersecting with the vertical direction as illustrated in FIG. 9 may be used. The guide protrusion 201*a* of the in-body connector 200 in the present modification example is guided by the guide rail 202*a* extending in the movement direction D3 inclined downward with respect to the insertion direction D1. The movement direction D3 may be substantially the same direction as the attachment completion direction D2, or may be a direction between the attachment completion direction D2 and the downward vertical direction. Also according to such a configuration, stable connection between the connectors can be realized by employing a configuration in which the in-tray connector 100 engages with the in-body connector 200 while the cartridge tray 3 moves in the insertion direction D1.

In addition, although the insertion direction D1 of the cartridge tray 3 has been described as an approximate horizontal direction in the first embodiment, the insertion direction D1 may be inclined with respect to the horizontal direction. For example, a configuration in which the insertion direction D1 is inclined downward toward the rear side in the Y direction and the attachment completion direction D2 is inclined downward at an angle steeper than the insertion direction D1 may be employed.

In addition, in the first embodiment described above, the attachment operation of the cartridge tray 3 is constituted by two-step motions including a motion in the insertion direction D1 and a motion in the attachment completion direction D2. The configuration is not limited to this, and for example, the guide rails and the like may be formed such that the movement direction of the cartridge tray 3 continuously changes from the insertion direction D1 to the attachment completion direction D2. In this case, the "second direction" is a movement direction of the cartridge tray 3 reaching the attached position serving as a third position. The "first direction" is a movement direction of the cartridge tray 3 in a portion which is upstream of the portion where the cartridge tray 3 moves in the second direction and in which the inclination of the movement direction with respect to the horizontal direction is smaller than the inclination of the second direction with respect to the horizontal direction in the movement trajectory of the cartridge tray 3.

To be noted, as the in-tray connector 100 and the in-body connector 200, connector configurations typically known as drawer connectors can be preferably used. Drawer connectors are connectors including guide mechanisms that fit together before the terminals thereof are connected to each other.

Second Embodiment

An image forming apparatus according to a second embodiment will be described with reference to FIGS. 10 and 11A to 11C. The present embodiment is different from the first embodiment in that the in-tray connector is movable and the position of the in-body connector is fixed. In the description below, elements denoted by the same reference signs as in the first embodiment are assumed to have substantially the same configuration and substantially the same effect as in the first embodiment, and mainly parts different from the first embodiment will be described.

Figure 10:
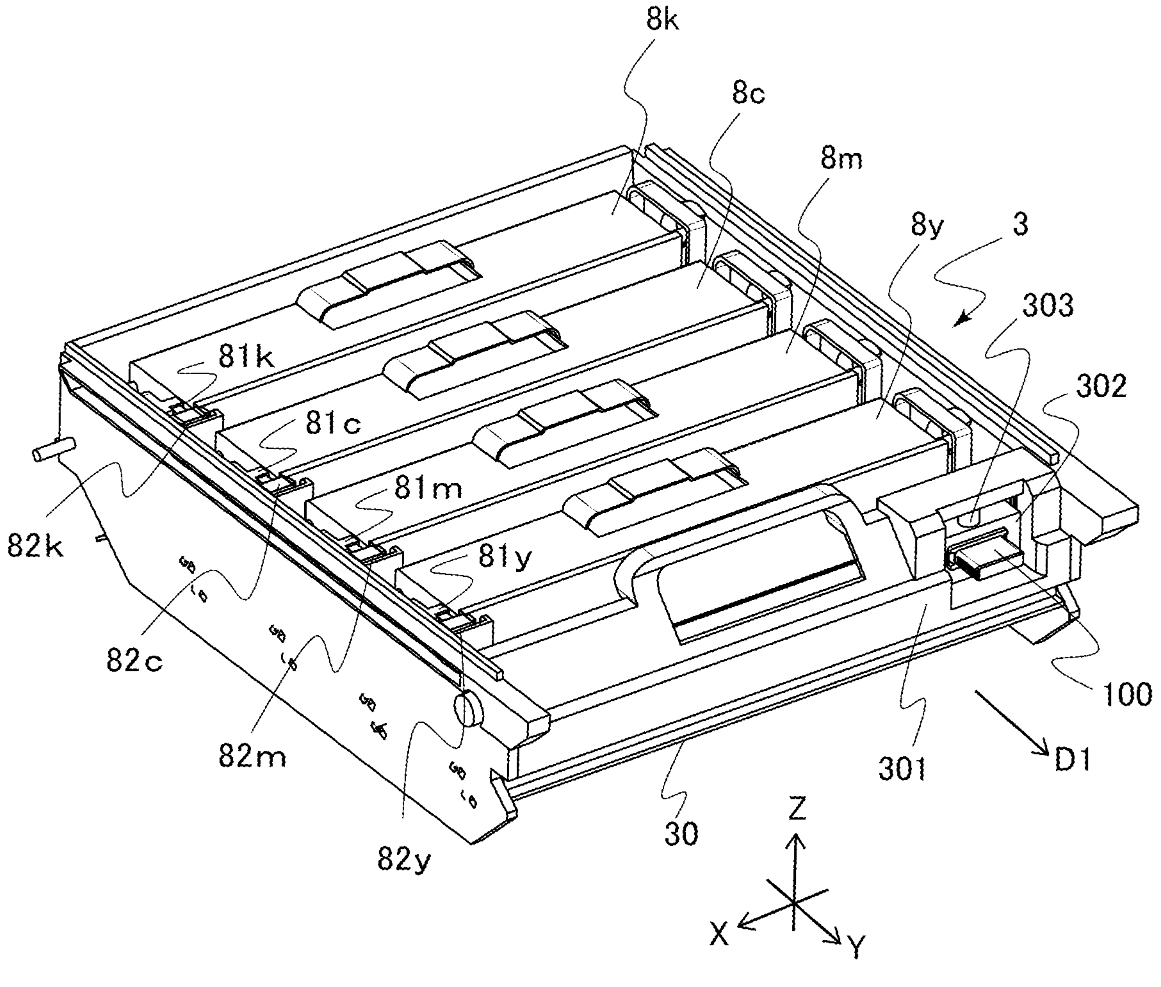
FIG. 10 is a perspective view of a cartridge tray according to a second embodiment.

FIG. 10 is a perspective view of the cartridge tray 3 of the second embodiment. Similarly to the first embodiment, the in-tray connector 100 is disposed on the downstream side, that is, the leading end side of the cartridge tray 3 in the insertion direction D1. The memory tags 81*k* to 81*y* of the developing cartridges 8*k* to 8*y* attached to the cartridge tray 3 are electrically connected to the in-tray connector 100 via the tray memory contacts 82*k* to 82*y* and an unillustrated relay board. Similarly, unillustrated drum memory tags provided in the cartridge tray 3 are also electrically connected to the in-tray connector 100.

The in-tray connector 100 of the present embodiment is provided so as to be movable up and down in the Z direction with respect to the tray frame body 30 of the cartridge tray 3. Specifically, the in-tray connector 100 is attached to a connector holder 302, and the connector holder 302 is supported by a rear frame 301 of the tray frame body 30 in a state in which the movement direction thereof is restricted to an approximate vertical direction. A spring member 303 serving as an urging member is disposed between the connector holder 302 and the rear frame 301, and the connector holder 302 is urged downward by the spring member 303. Therefore, when the cartridge tray 3 is at the drawn-out position, the in-tray connector 100 stands by in a lower position of the movable range.

Figure 11A:
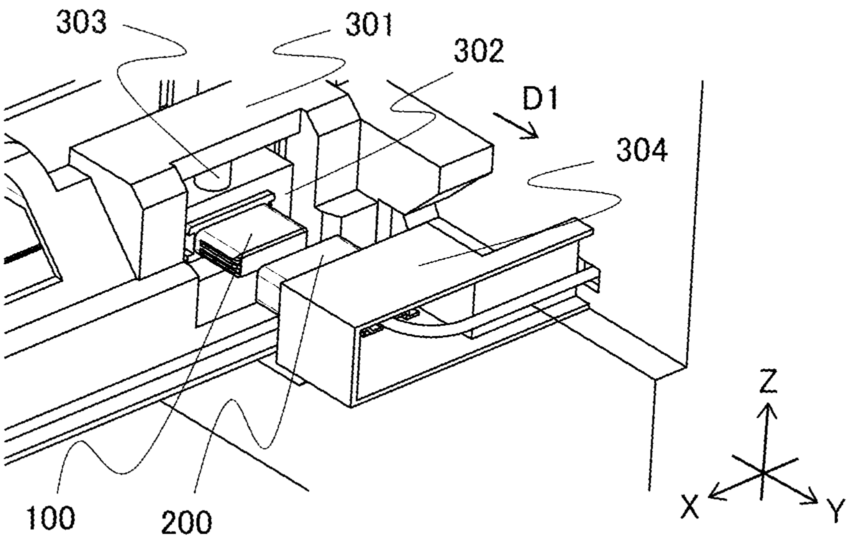
FIGS. 11A to 11C are diagrams for describing connection of connectors according to the second embodiment.
Figure 11B:
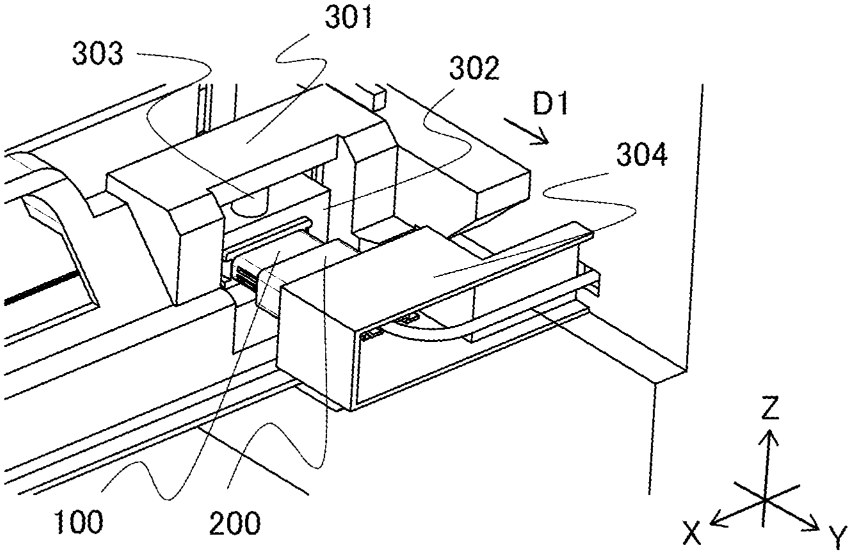
Figure 11C:
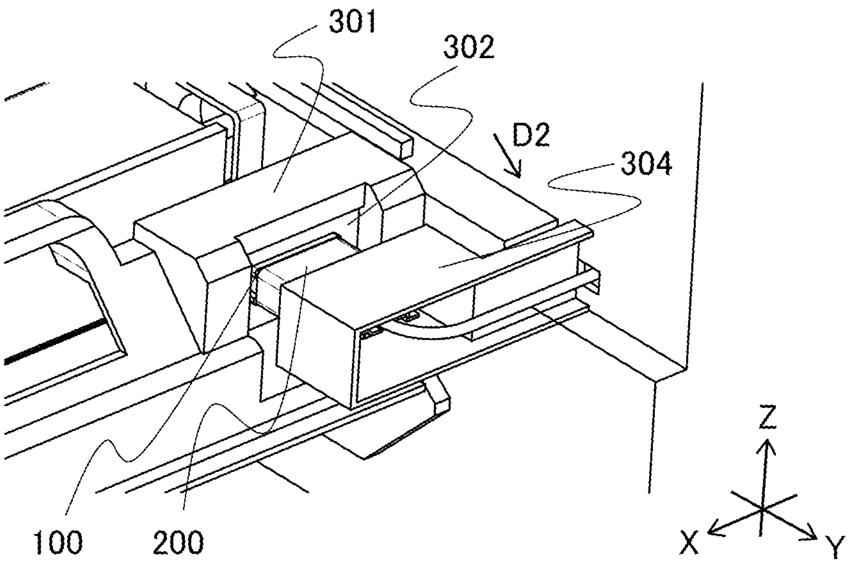

In contrast, the in-body connector 200 is attached to a connector fixing holder 304 fixed to the frame body of the apparatus body 2 as illustrated in FIGS. 11A to 11C, and thus the position thereof is fixed with respect to the apparatus body 2. In addition, the in-body connector 200 is electrically connected to the control board 2C of the apparatus body 2 via a wiring member. The height of the in-body connector 200 in the Z direction is approximately equal to the height of the in-tray connector 100 positioned at the lower position.

A connection operation of the present embodiment will be described. FIG. 11A illustrates a state in the middle of movement of the cartridge tray 3 from the drawn-out position to the drum separation position, FIG. 11B illustrates a state in which the cartridge tray 3 is in the drum separation position, and FIG. 11C illustrates a state in which the cartridge tray 3 is in the attached position.

When the cartridge tray 3 is inserted in the insertion direction D1 from the drawn-out position toward the drum separation position along the guide rails 41, the in-tray connector 100 is urged by the spring member 303 described above and stands by in the lower position as illustrated in FIG. 11A. When the cartridge tray 3 is inserted further, the distal end of the in-tray connector 100 reaches the in-body connector 200 before the cartridge tray 3 reaches the drum separation position. Then, when the cartridge tray 3 has reached the drum separation position at least as illustrated in FIG. 11B, the in-tray connector 100 and the in-body connector 200 are engaged, that is, provisionally connected. However, the terminals of the in-tray connector 100 and the in-body connector 200 are not electrically connected to each other. In addition, in a section between the drawn-out position and the drum separation position, the cartridge tray 3 moves in the insertion direction D1, which is an approximate horizontal direction, while maintaining a state in which the photosensitive drums 4*k* to 4*y* are separated from the electrostatic attraction belt 12.

When the cartridge tray 3 is inserted further, the cartridge tray 3 moves from the drum separation position to the attached position in the attachment completion direction D2 while maintaining the engaged state between the in-tray connector 100 and the in-body connector 200 as illustrated in FIG. 11C. At this time, the in-tray connector 100 relatively moves upward in the Z direction with respect to the rear frame 301 of the cartridge tray 3. In addition, since the cartridge tray 3 moves in the attachment completion direction D2 inclined downward toward the rear side in the Y direction, the in-tray connector 100 moves toward the rear side in the Y direction, and is more deeply fitted together with the in-body connector 200, and thus the terminals thereof come into contact with each other. Then, when the cartridge tray 3 reaches the attached position, the connection between the in-tray connector 100 and the in-body connector 200 is completed.

As described above, since a configuration in which the in-tray connector 100 engages with the in-body connector 200 while the cartridge tray 3 moves in the insertion direction D1 is employed in the second embodiment, stable connection between the connectors can be realized. In addition, also in the present embodiment, the connectors are each disposed in an orientation directed in an approximate horizontal direction, and therefore the possibility of foreign matter such as dust entering the inside of the connectors can be reduced to realize more stable connection.

Modification Example

To be noted, although the in-tray connector 100 is urged downward by the spring member 303 serving as an urging member in the second embodiment, for example, a configuration in which the in-tray connector 100 detached from the in-body connector 200 stands by in the lower position by the weight thereof may be employed.

Other Embodiments

In the first and second embodiments, a configuration in which developing cartridges are attached to and detached from a cartridge tray including photosensitive drums has been described as an example. The configuration is not limited to this, and a configuration in which a cartridge including photosensitive drums and drum memory tags such as a process cartridge integrated with the developing cartridges or a photoconductor cartridge different from the developing cartridges is attached to and detached from a tray not including photosensitive drums may be employed.

In addition, the electrostatic attraction belt 12 of the first and second embodiments is merely an example of a belt member included in the image forming apparatus, and the present technology may be applied to, for example, an image forming apparatus including an intermediate transfer belt serving as an intermediate transfer member. In this case, a configuration in which the photosensitive drums are in contact with the intermediate transfer belt when the cartridge tray 3 is in the attached position, and the photosensitive drums are separated from the intermediate transfer belt when the cartridge tray 3 moves between the drum separation position and the drawn-out position is preferably employed.

In addition, in the first and second embodiments described above, a case where the photosensitive drums 4*k* to 4*y* come into contact with the electrostatic attraction belt 12 when the cartridge tray 3 reaches the attached position serving as a third position along the inclined surfaces 41*b* of the guide rails 41 and the like has been described. Instead of this, for example, a configuration in which the photosensitive drums do not come into contact with the electrostatic attraction belt 12 when the cartridge tray 3 reaches the attached position, and the photosensitive drums come into contact with the electrostatic attraction belt 12 as a result of the cartridge tray 3 or the electrostatic attraction belt 12 moving in accordance with an operation of closing the front door 40 may be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038853, filed on Mar. 6, 2020, which is hereby incorporated by reference herein in its entirety.

What is claimed is:

1. An image forming apparatus comprising:
- an apparatus body including a controller and a guide portion;
- a photoconductor unit including an attachment portion and a photoconductor rotatable about a rotational axis, the photoconductor unit being attached to the apparatus body so as to move with respect to the apparatus body while being guided by the guide portion;
- a developing cartridge configured to be attachable to and detachable from the attachment portion of the photoconductor unit, the developing cartridge including:
  - a casing configured to accommodate developer;
  - a developing roller configured to develop an electrostatic latent image on the photoconductor by supplying the developer to the photoconductor; and
  - a storage medium configured to store information about the developing cartridge,
- wherein the photoconductor unit is configured to move in an insertion direction from an outside position toward an inside position, the outside position being a position where the developing cartridge is attachable to and detachable from the attachment portion of the photoconductor unit, the inside position being a position which is below the outside position and in which the photoconductor unit is capable of being used for image formation,
- wherein the photoconductor unit includes a first connector including a first contact terminal configured to be electrically connected to the storage medium in a state in which the developing cartridge is attached to the attachment portion of the photoconductor unit,
- wherein the apparatus body includes a second connector including a second contact terminal electrically connected to the controller, the second connector being configured to engage with the first connector when the photoconductor unit is at the inside position, and
- wherein at a timing when the first connector of the photoconductor unit and the second connector of the apparatus body start to engage with each other while the photoconductor unit is being moved from the outside position toward the inside position, the photoconductor unit is guided by the guide portion.

2. The image forming apparatus according to claim 1,
- wherein the apparatus body includes a rotatable belt member, and
- wherein the photoconductor is in contact with the belt member in a state in which the photoconductor unit is in the inside position.

3. The image forming apparatus according to claim 2, wherein the belt member is configured to form a nip portion between the belt member and the photoconductor and convey, through the nip portion, a recording medium onto which a developer image is to be transferred from the photoconductor.

4. The image forming apparatus according to claim 1,
- wherein the photoconductor unit includes a unit frame supporting the photoconductor, and wherein the second connector is movable with respect to the unit frame in a direction intersecting with the insertion direction.

5. The image forming apparatus according to claim 1, wherein the guide portion of the apparatus body includes:

a first guide surface disposed on a first side with respect to the photoconductor unit in a direction of the rotational axis of the photoconductor, and extending in the insertion direction; and a second guide surface disposed on a second side opposite to the first side with respect to the photoconductor unit in the direction of the rotational axis, and extending in the insertion direction, and wherein the photoconductor unit includes a first guided portion configured to be in contact with and guided by the first guide surface and a second guided portion configured to be in contact with and guided by the second guide surface.

6. The image forming apparatus according to claim 5, wherein the first guided portion includes a first roller configured to rotate on the first guide surface, wherein the second guided portion includes a second roller configured to rotate on the second guide surface, and wherein at the timing when the first connector of the photoconductor unit and the second connector of the apparatus body start to engage with each other while the photoconductor unit is being moved from the outside position toward the inside position, the first roller and the second roller are respectively in contact with the first guide surface and the second guide surface.

* * * * *